US005543916A

United States Patent [19]
Kachanov

[11] Patent Number: 5,543,916
[45] Date of Patent: *Aug. 6, 1996

[54] INTERFEROMETER WITH ALIGNMENT ASSEMBLY AND WITH PROCESSOR FOR LINEARIZING FRINGES FOR DETERMINING THE WAVELENGTH OF LASER LIGHT

[75] Inventor: Alexander A. Kachanov, Moscow, Russian Federation

[73] Assignee: Science Solutions, Inc., San Diego, Calif.

[ * ] Notice: The term of this patent shall not extend beyond the expiration date of Pat. No. 5,420,687.

[21] Appl. No.: 214,805

[22] Filed: Mar. 16, 1994

Related U.S. Application Data

[63] Continuation-in-part of Ser. No. 147,994, Nov. 4, 1993.

[51] Int. Cl.$^6$ ..................................... G01B 9/02
[52] U.S. Cl. .................. 356/354; 356/346; 356/353; 356/399
[58] Field of Search .................................... 356/353, 354, 356/345, 346, 399, 153, 138

[56] References Cited

U.S. PATENT DOCUMENTS

| | | | |
|---|---|---|---|
| 3,937,580 | 2/1976 | Kasdan | 356/156 |
| 4,173,442 | 11/1979 | Snyder | 356/346 |
| 5,146,284 | 9/1992 | Tabarelli | 356/358 |
| 5,168,324 | 12/1992 | Hackel et al. | 356/346 |
| 5,177,566 | 1/1993 | Leuchs | 356/358 |
| 5,198,872 | 9/1993 | Wakabayashi et al. | 356/352 |
| 5,245,408 | 9/1993 | Cohen | 356/351 |
| 5,253,183 | 10/1993 | Inoue et al. | 364/525 |
| 5,305,330 | 4/1994 | Rieder et al. | 356/345 |
| 5,420,687 | 5/1995 | Kachanov | 356/353 |

OTHER PUBLICATIONS

Catalogue page: Opthos Instruments, Inc., 17805 Caddy Dr. Rockville, MA 20855, The Opthos Wavemeter (Tellurium)—Undated.
Brochure: ILX Lightwave, 920 Technology Blvd., West, Boseman, Montana LWM–6500 Laser Wavelength Meter—Undated.
Advantest Corp.—300 Knightsbridge Parkway, Lincolnshire, Illinois 60069 Jun. 1990—Spec Sheet—Optical Wavelength Meter.
Optical Engineering, Inc. P.O. Box 696, Santa Rosa, CA 95402, Spec Sheet $CO_2$ Spectrum Analyzer—Undated.
LaserTechnics—Data Sheet—Dec. 1988—Model 100–F Fizeau Wavelength Interferometer.
Catalogue pp. 34–45—Burleigh Technology—Wavemeters Undated—.

*Primary Examiner*—Frank Gonzalez
*Assistant Examiner*—Robert Kim
*Attorney, Agent, or Firm*—John L. Rogitz

[57] ABSTRACT

A wavelength meter for measuring the wavelength of laser light includes a diffraction element for diffracting the light and a glass plate interferometer in light communication with the diffraction element for generating a sinusoidally-shaped interference fringe pattern. The interference fringe pattern is detected by a CCD array which sends a signal representative of the fringe pattern to a computer. The computer filters and analyzes the signal, and corrects the signal for temperature-induced changes in the optical path of the laser light beam. The computer compares the signal with a prestored signal representing a predetermined fringe pattern using a least-squares fit analysis, and from this analysis determines the wavelength of the laser light. An alignment assembly is provided for facilitating directing laser light through the aperture of the diffraction element.

13 Claims, 6 Drawing Sheets

INTERFEROMETER WITH ALIGNMENT ASSEMBLY AND WITH PROCESSOR FOR LINEARIZING FRINGES FOR DETERMINING THE WAVELENGTH OF LASER LIGHT

FIELD OF THE INVENTION

The present application is a continuation-in-part of and claims priority from co-pending U.S. patent application Ser. No. 08/147,994 filed Nov. 4, 1993 for an invention entitled "Wavelength Meter", assigned to the same assignee as the present invention.

The present invention relates generally to interferometers, and more particularly to methods and apparatus for measuring the wavelength of laser light.

BACKGROUND

Lasers are used in a wide variety of applications, and it is often necessary to ascertain the precise wavelength of the laser light being used, for a number of reasons. Accordingly, instruments known as wavelength meters have been developed for rendering precise measurements of the wavelength of laser light.

Among the wavelength meters in existence is the device disclosed in U.S. Pat. No. 4,173,442 to Snyder. The Snyder device includes a Fizeau interferometer into which laser light is directed, and the interferometer produces an interference fringe pattern which is received by a photo diode array. In accordance with the Snyder disclosure, the photo diode array generates an electrical signal representative of the fringe pattern, and the signal is sent to a computer. Then, the computer determines the wavelength of the laser light by analyzing the spatial period and phase of the fringe pattern. To simplify analysis, Snyder discloses a somewhat complicated optical system the components of which must be precisely positioned relative to each other, to produce a fringe pattern composed of straight co-parallel lines of equidistant spacing.

U.S. Pat. No. 5,168,324 to Hackel et al. discloses an improvement to the Snyder device. In accordance with Hackel et al., a wedge that has an elliptically-shaped face is interposed in the optical path of a Snyder-type device to improve the accuracy of the Snyder-type device. Like Snyder, however, Hackel et al. requires the use of a relatively complicated optical system having precisely positioned components.

Snyder and Hackel et al. are representative of many if not most wavelength meters currently in use, in that they require the use of a relatively complicated optical system having precisely positioned components. As the skilled artisan will appreciate, it can be time-consuming and therefore expensive to precisely position a number of components for each wavelength meter that is to be used.

Further, analytically accounting for temperature variations measurement-to-measurement has not heretofore been suggested in the prior art. Such variations can cause unwanted movement of the precisely positioned optical components. Snyder, like other prior art devices, deals with such variations not by analysis, but by requiring the use of a heating device to maintain the Snyder apparatus at a predetermined temperature. Unfortunately, it can be difficult at best to maintain the entire base plate on which the optical components rest, as well as the components themselves, at a constant temperature, due to temperature gradients which are inevitably introduced by the heating device.

As recognized by the present invention, a structurally simple wavelength meter can be provided which can generate very accurate wavelength measurements and analytically account for temperature variations affecting the optical path.

It accordingly is an object of the present invention to provide a simplified wavelength meter of a very compact size. A further object of the present invention is to provide a wavelength meter having a minimum of the optical elements while providing a wavelength measurement resolution of a few parts in $10^7$. Still another object of the present invention is to provide a wavelength meter which minimizes the influence of ambient temperature changes on the accuracy of the wavelength meter. A still further object of the present invention is to provide a wavelength meter which is relatively impervious to creep and leaps in the wavelength readout caused by temperature-induced mechanical stress on the wavelength meter components. Yet another object of the present invention is to provide a wavelength meter in which a laser beam can easily and quickly be aligned with a diffraction aperture, while reducing risk of damage a wavelength meter in which a laser beam can easily and quickly be aligned with a diffraction aperture, while reducing risk of damage to the laser and wavelength meter components, and while reducing chromatic error in the wavelength meter.

SUMMARY OF THE INVENTION

A wavelength meter for determining the wavelength of a light beam includes a diffraction element formed with an aperture. At least part of the light beam can be directed through the aperture. Also, an interferometer is positioned in light communication with the aperture, and the interferometer has at least two reflective planes, each plane reflecting the light beam from the aperture. Consequently, the reflected light from one plane interferes with the reflected light from the other plane to thereby generate a sinusoidally-shaped interference pattern. A light receiver is positioned to detect the interference pattern, and a computer is electrically connected to the light receiver to determine the wavelength of the light beam based upon the interference pattern.

In the presently preferred embodiment, the wavelength meter includes a mounting platform and a thermally insulative housing. The diffraction element, interferometer, and light receiver are positioned on the mounting platform and the mounting platform is positioned inside the housing. The light detector is preferably a CCD array and the interferometer is preferably a glass plate.

Preferably, the thermally insulative housing includes a wall and the mounting platform includes first and second ends, and the time period for a temperature gradient across the wall of the insulative housing to reach zero is substantially greater than the time period for a like temperature gradient between the first and second ends of the mounting platform to reach zero. Also, a temperature sensor is positioned inside the thermally insulative housing and is electrically connected to the computer for comparing the temperature sensed by the sensor with a predetermined temperature and determining the wavelength of the light beam in response thereto.

A base is juxtaposed with the thermally insulative housing, and the mounting platform is attached to the base. In one embodiment, the base is a hollow outer holder container positionable adjacent a laser apparatus. In another embodiment, the base is a portion of a laser apparatus.

In either case, a plurality of thermally insulative connectors interconnect the mounting platform and base, such that mechanical stress on the mounting platform caused by thermal expansion or contraction of the base is reduced. As envisioned by the present invention, the mounting platform can be a parallelepiped-shaped plate having a first edge, a second edge orthogonal to the first edge, and a third edge orthogonal to the second edge, and the connectors are first, second, and third flat springs each having a first end attached to the respective first, second, and third edges of the mounting platform and a second end attached to the base.

In another aspect of the present invention, a wavelength meter includes means for diffracting a beam of laser light, and an interferometer positioned adjacent the diffracting means in light communication therewith for generating a curvilinear interference fringe pattern. Further, a light receiver is positioned for detecting the curvilinear interference fringe pattern and generating a first signal representative thereof. Means are provided for generating a second signal representative of the wavelength of the laser light beam in response to the first signal. In accordance with the present invention, the light receiver and the interferometer are substantially thermally isolated from the environment outside the wavelength meter.

In still another aspect of the present invention, a method is disclosed for determining the wavelength of a beam of laser light. The method includes the steps of diffracting the beam, and then splitting the beam to generate a curvilinear interference fringe pattern. The fringe pattern is received, and an electrical signal representative thereof is generated. Then, the fringe pattern represented by the electrical signal is linearized to generate a wavelength signal representative of the wavelength of the beam of laser light. The wavelength signal is then adjusted based upon a measured temperature.

In another aspect of the present invention, a wavelength meter for determining the wavelength of a light beam includes a mounting platform and a diffraction element mounted on the mounting platform and formed with a diffraction aperture. At least part of the light beam can be directed through the diffraction aperture. An interferometer is mounted on the mounting platform in light communication with the diffraction aperture for generating an interference pattern, and a light receiver is positioned on the mounting platform to detect the interference pattern. Further, an alignment assembly is mounted on the mounting platform for facilitating directing the light beam through the diffraction aperture.

Preferably, the mounting platform is positioned inside a thermally insulative housing, and the housing is formed with an opening. The alignment assembly includes an entrance aperture juxtaposed with the opening, and the entrance aperture is substantially larger than the diffraction aperture.

In accordance with the present invention, the entrance aperture is positioned a predetermined distance from the diffraction aperture to establish a light pathway therebetween. The alignment assembly further includes a focussing member disposed in the light pathway for focussing light from the entrance aperture into the diffraction aperture, such that the entrance aperture is a precise geometric optic image of the diffraction aperture.

As contemplated by the present invention, the focussing member includes at least one lens, and more preferably includes a focussing mirror having a concave surface facing the diffraction element. Moreover, the light beam is generated by a laser and the entrance aperture defines an axis, and the wavelength meter further includes, as an alignment tool, a target plate positioned without the housing and a reflecting plate juxaposed with the entrance aperture. Accordingly, the reflecting plate directs a light pattern onto the target plate for facilitating angular alignment of the light beam with respect to the axis of the entrance aperture. In the presently preferred embodiment, the diffraction aperture is circular.

In yet another aspect of the present invention, a wavelength meter for determining the wavelength of light generated by a laser includes a diffraction element formed with a diffraction aperture for diffracting the light. Also, the wavelength meter includes an entrance aperture which is substantially larger than the diffraction aperture and which is positioned between the diffraction aperture and the laser. As intended by the present invention, the entrance aperture is positioned a predetermined distance from the diffraction aperture to establish a light pathway therebetween. The alignment assembly further includes a focussing member disposed in the light pathway for focussing light from the entrance aperture into the diffraction aperture, such that the entrance aperture is a precise geometric optic image of the diffraction aperture.

In yet another aspect of the present invention, a method is disclosed for aligning a laser beam from a laser with the diffraction aperture of a diffraction element, wherein the diffraction element is positioned within an enclosed housing having an opening. The disclosed alignment method includes the steps of juxtaposing an entrance aperture with the opening of the housing, wherein the entrance aperture is substantially larger than the diffraction aperture to facilitate directing the light beam through the entrance aperture. A focussing member is positioned in the housing to focus substantially all the light from the entrance aperture into the diffraction aperture, and a reflecting plate that has two reflective surfaces is juxtaposed with the entrance aperture, such that the reflecting plate reflects a light pattern. Then, a target plate is positioned to receive the light pattern from the reflecting plate. This pattern is observed, and a predetermined line-of-sight between the laser and the entrance aperture is established in response thereto.

The details of the present invention, both as to its construction and operation, can best be understood in reference to the accompanying drawings, in which like numerals refer to like parts, and which:

DETAILED DESCRIPTION OF THE PREFERRED EMBODIMENT

Figure 1:
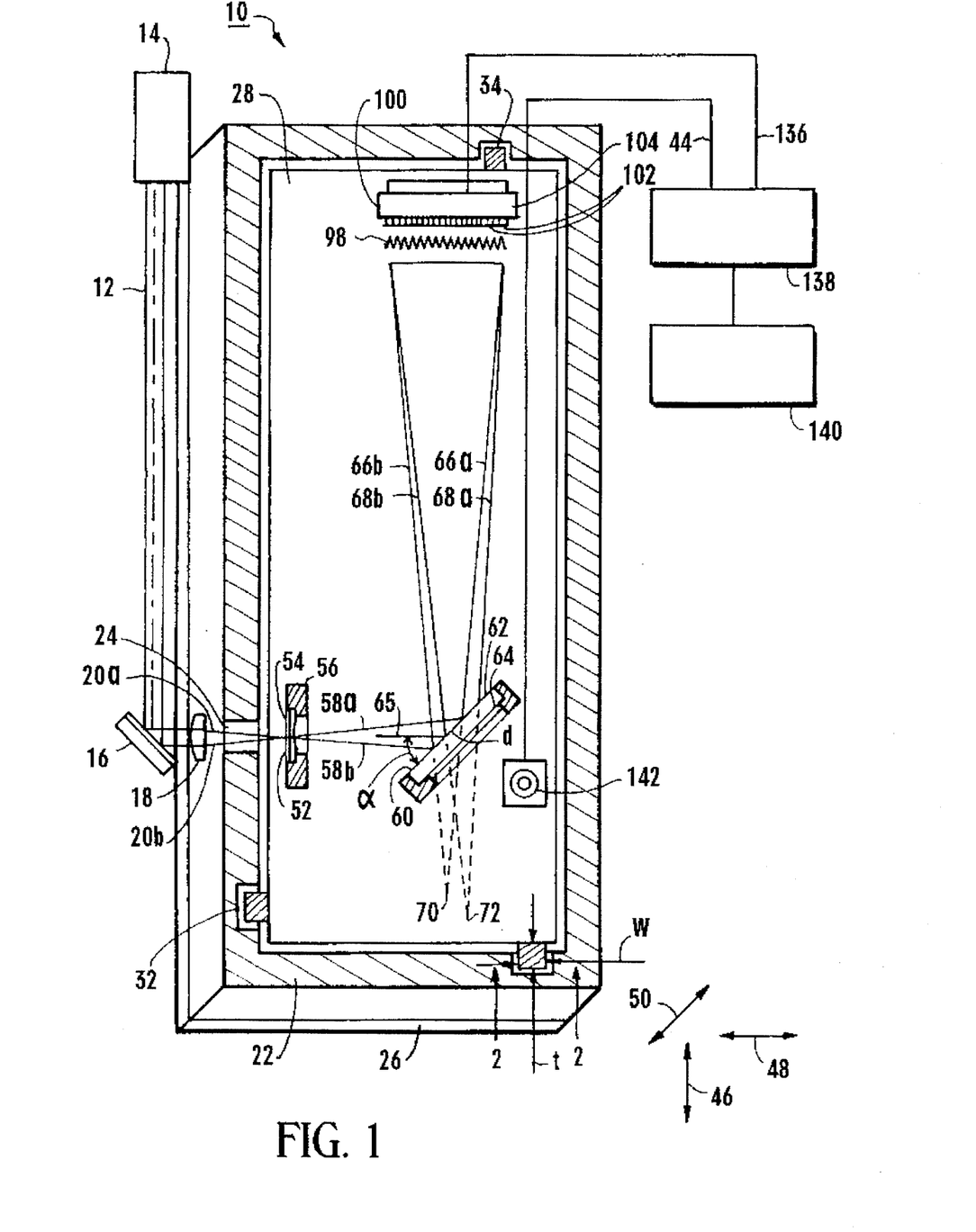
FIG. 1 is a schematic view of the wavelength meter of the present invention.

Referring initially to FIG. 1, a wavelength meter is shown, generally designated 10. As shown, a light beam 12 from a monochromatic light source, for example a tunable laser 14, is directed by a mirror 16 into a focussing lens 18. From the focussing lens 18, the light is directed into the wavelength meter 10. In FIG. 1, the light which enters the wavelength meter 10 is represented by two ray lines 20a, 20b.

The mirror 16 is rotatably mounted by means well-known in the art and can be manipulated as appropriate for directing the light beam 12 onto the lens 18. Further, the lens 18 is mounted by means well-known in the art for translational movement in three degrees of freedom, and the lens 18 may be manipulated as appropriate for focussing the light beam 12 onto the components of the wavelength meter 10, as more fully disclosed below.

As shown more particularly in FIG. 1, the wavelength meter 10 includes a hollow parallelepiped-shaped thermal housing 22, and the light from the laser 14 is directed through an opening 24 which is formed in the housing 22. Preferably, the housing 22 is made of a rigid, thermally insulative material, e.g., insulated plastic, styrofoam, etc. Also, a transparent glass window (not shown) can be positioned in the opening 24, such that the interior of the housing 22 is substantially thermally isolated from the exterior of the housing 22.

In the presently preferred embodiment, the wall thickness of the thermal housing 22, as well as its material, are selected so that the time to reach thermal equilibrium across the wall of the housing 22 is much longer than the time it takes each of the elements within the housing 22 to reach thermal equilibrium and to reach thermal equilibrium between different elements. Stated differently, the time period for a temperature gradient across the wall of the insulative housing to reach zero is substantially greater than the time period for a like temperature gradient across the elements within the housing 22 to reach zero. For example, the thermal time constant of a temperature change across the wall of the housing 22 is preferably greater than ten hours, whereas the thermal time constant for the components disposed within the housing 22 is preferably less than half an hour.

Accordingly, by essentially thermally isolating the components within the housing 22, and by means of the analysis method disclosed below, the requirement of prior art devices such as Snyder of using a heater to maintain a constant temperature is avoided. The Snyder approach is less than optimum, because a temperature sensor and a heater in any temperature stabilizing device are located some distance apart. Consequently, a nonuniform temperature distribution is always present in such a device. In other words, a temperature stabilizing device maintains the temperature at a temperature sensor, and not necessarily the temperature of the entire system.

The housing 22 is supported by a metallic base plate 26. The base plate 26 can be part of a hollow outer container which surrounds and holds the housing 22. In such an embodiment, the wavelength meter 10 is a stand-alone device, in that it is contained in a container separate from the laser 14 apparatus. Alternatively, the base plate 26 can be part of the laser 14 apparatus. As the skilled artisan will recognize, when the base plate 26 is part of the laser 14 apparatus, the wavelength meter 10 is contained internally within the laser 14 apparatus.

FIG. 1 also shows that the wavelength meter 10 includes a mounting platform 28 which is disposed in the thermal housing 22. Preferably, the mounting platform 28 is an aluminum plate. In the presently preferred embodiment, the mounting platform 28 is connected to the base plate 26 by three flat thermally insulative springs 30, 32, 34.

Figures 2, 3, 4, 5, 6:
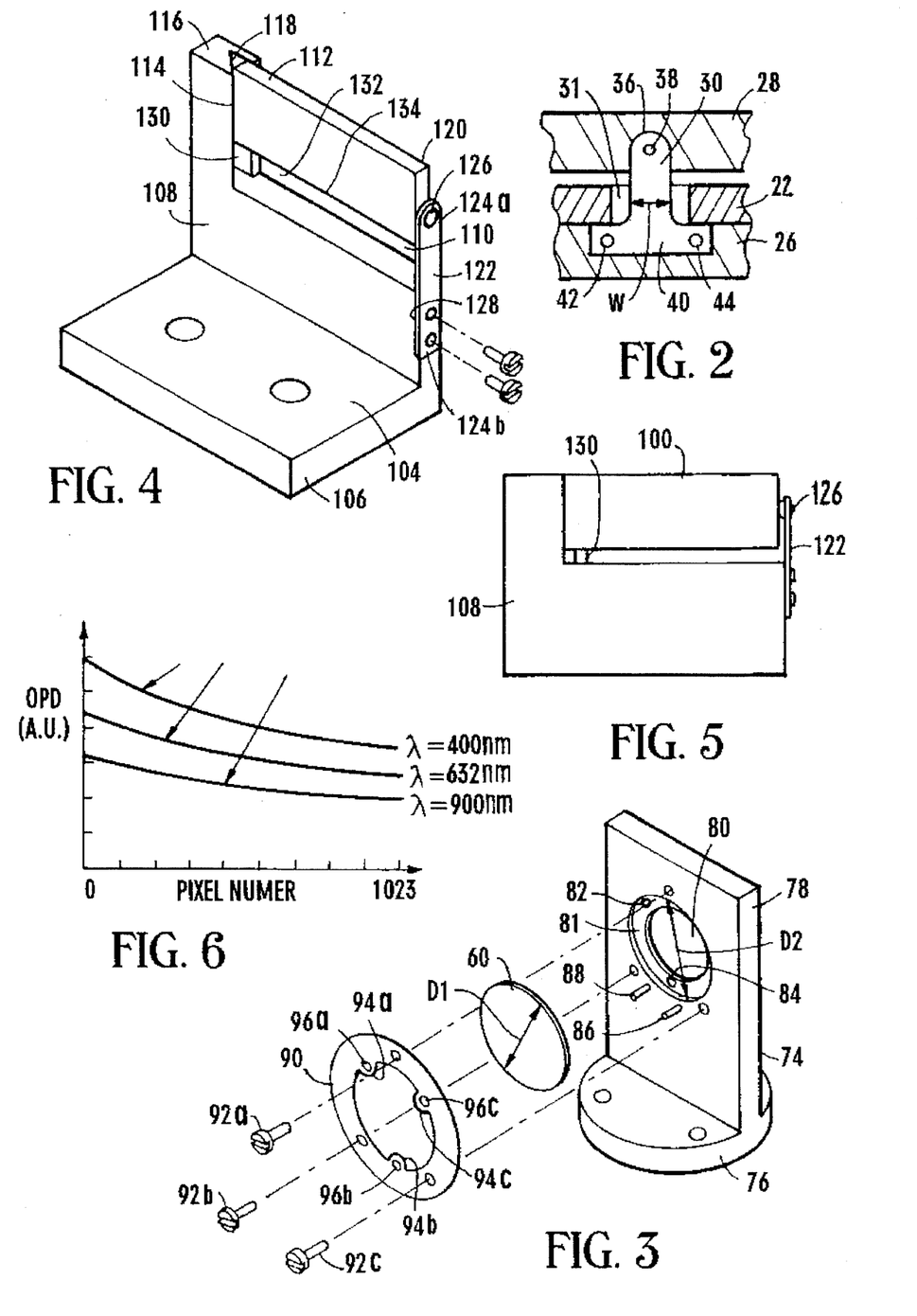
FIG. 2 is a cross-sectional view of one of the flat springs of the present invention, as would be seen along the line 2—2 in FIG. 1.
FIG. 3 is an exploded isometric view of the interferometer with thermal isolation mount.
FIG. 4 is an isometric view of the CCD array with thermal isolation mount.
FIG. 5 is an orthogonal view of the CCD array shown in FIG. 4, from the side of the array opposite to the interferometer.
FIG. 6 is a graph of optical path difference versus pixel number.

Referring briefly to FIG. 2, the means by which the mounting platform 28 is connected to the base plate 26 can be better appreciated. As shown in FIG. 2, the spring 30 has a first end 36 which is fixedly connected to the mounting platform 28 by a screw 38. Also, the spring 30 extends through a hole 31 that is formed in the thermal housing 22, and the spring 30 has a flared second end 40 which is fixedly connected to the base plate 26 by two screws 42, 44.

The thickness "t" of the spring 30 (FIG. 1) is less than the width "w" of the spring 30 (FIGS. 1 and 2). Consequently, as can best be appreciated in reference to FIG. 1, the spring 30 permits motion in the directions indicated by the arrows 46 of the mounting platform 28 with respect to the base plate 26. In contrast, the spring 30 substantially inhibits motion in the directions indicated by the arrows 48, 50 of the mounting platform 28 relative to the base plate 26. Likewise, the spring 34 permits motion in the directions indicated by the arrows 46 of the mounting platform 28 with respect to the base plate 26, while inhibiting motion in the directions indicated by the arrows 48, 50 of the mounting platform 28 relative to the base plate 26. It can be further appreciated in reference to FIG. 1 that the spring 32 permits motion in the directions indicated by the arrows 48 of the mounting platform 28 with respect to the base plate 26, while inhibiting motion in the directions indicated by the arrows 46, 50 of the mounting platform 28 relative to the base plate 26.

It is to be understood that the combination of structure disclosed above permits relatively firm mounting of the mounting platform 28 on the base plate 26, while minimizing mechanical loading of the mounting platform 28 (and, hence, minimizing movement of the platform 28) due to thermal expansion and contraction of the base plate 26. In other words, the springs 30, 32, 34 isolate the mounting platform 28 from thermal expansion and contraction of the base plate 26 by absorbing mechanical stress caused by thermal expansion and contraction of the base plate 26, or caused by external mechanical forces applied to the wavelength meter 10.

FIG. 1 shows that the ray lines 20a, 20b are focussed by the focussing lens 18 onto a diffraction element 52. In the presently preferred embodiment, the diffraction element 52 is a metal disc that is formed with an aperture 54. The aperture 54 may be a rectangular slot, or it may be a pinhole having a diameter of about two microns to fifteen microns (2–15μ). In either case, the aperture 54 is configured for diffracting light having a wavelength in the visible spectrum.

As shown in FIG. 1, the diffraction element 52 is supported by an aluminum element holder 56. In turn, the element holder 56 is fixedly attached to the mounting platform 28 by means well-known in the art.

As the skilled artisan will recognize, light is diffracted as it passes through the aperture 54 such that the light which emerges from the diffraction element 52 is a nearly ideal spherical wave, represented by the ray lines 58a, 58b. This spherical wave is directed toward an interferometer 60.

The interferometer 60 preferably is a plane parallel optically polished dielectric plate having a front surface 62 separated from a co-parallel rear surface 64 by a distance "d". The distance "d" is equal to a few tenths of a millimeter, and the plate is made of a material which is optically transparent in the desired wavelength range. For example, fused silica or quartz glass may be used when the wavelength of the laser light is in the ultraviolet to the near infrared range.

As shown in FIG. 1, the interferometer 60 is the only optical element of the wavelength meter 10. Because the interferometer 60 may be placed very close to the aperture 54, typically at a distance of about ten millimeters (10 mm), a very small area of the interferometer 60 is illuminated by the light. More particularly, only about two to three millimeters (2 mm–3 mm) of the interferometer 60 surface play an essential role in the operation of the wavelength meter 10. Because only a small portion of the interferometer 60 reflects/refracts light, and because of the novelty of the analysis of the present invention described in more detail below, the interferometer 60 may have relatively large tolerances. More specifically, the surfaces 62, 64 of the interferometer 60 across the used small area need be polished to a flatness of only approximately one-fifth of one wavelength, and indeed a flatness approaching one-half of one wavelength is sufficient.

While the interferometer 60 is a plane parallel reflective interferometer in the preferred embodiment, a wedge-shaped reflective interferometer can be also used. Alternatively, an interferometer can be used which utilizes double refraction in a birefringent media for splitting the incoming wave into two parts.

Preferably, the interferometer 60 is positioned such that its front surface 62 establishes an angle α of between about ten degrees and eighty degrees (10°–80°), and more preferably forty five degrees (45°), with respect to the axis 65 of the light beam 12 that impinges the front surface 60.

As shown in FIG. 1, a portion of the light travelling along the ray line 58a is reflected off the front surface 62 of the interferometer 60 along a ray line 66a. Also, a portion of the light travelling along the ray line 58a propagates through the front surface 62 along a ray line 68a, undergoes refraction, is reflected off the rear surface 64 to the front surface 62, and again undergoes refraction as it emerges from the front surface 62.

Similarly, a portion of the light travelling along the ray line 58b is reflected off the front surface 62 of the interferometer 60 along a ray line 66b. Also, a portion of the light travelling along the ray line 58b propagates through the front surface 62 along a ray line 68b, undergoes refraction, is reflected off the rear surface 64 to the front surface 62, and again undergoes refraction as it emerges from the front surface 62.

FIG. 1 shows that the ray lines 66a, 66b can be extended behind the interferometer 60 to establish a first imaginary point source 70. Further, the ray lines 66b, 68b can be extended behind the interferometer 60 to establish a second imaginary point source 72. As the skilled artisan will appreciate, light "from" the first point source 70 (i.e., light travelling along the ray lines 66a, 68a) interferes with light "from" the second point source 72 (i.e., light travelling along the ray lines 68a, 68b) to produce a sinusoidal interference fringe pattern. Stated differently, a high contrast two-beam interference fringe pattern is generated by the interferometer 60.

FIG. 3 shows the means by which the interferometer 60 is stably held on the mounting platform 28, while also isolating the interferometer 60 from movement caused by thermally-induced mechanical stress. More specifically, an interferometer holder 74 has a disc-shaped base 76 which is fixedly attached, e.g., by screws, to the mounting platform 28, and the holder 74 has a parallelepiped-shaped support 78 extending upwardly from the base 76 orthogonally thereto.

As shown in FIG. 3, the support 78 has a circular window 80 which defines a seating surface 81. Three metals balls (only balls 82, 84 shown in FIG. 3) are spaced around the circumference of the window 80 equidistantly from each other, and the balls 82, 84 are press fit into the seating surface 81. Also, two cylindrically-shaped metal wires 86, 88 are press fit into the seating surface 81.

As can be seen in FIG. 3, the interferometer 60 has a diameter "D1", the window 80 has a diameter "D2", and the diameter "D1" is between one half millimeter and three millimeters (0.5 mm–3 mm) less than the diameter "D2". Accordingly, the interferometer 60 can be positioned within the window 80 against the balls 82, 84. Moreover, the interferometer 60 rests on the wires 86, 88.

Still referring to FIG. 3, a circularly-shaped flat metal spring ring 90 is juxtaposed with the interferometer 60 and is fastened to the support 78 by three screws 92a, 92b, 92c. The ring 90 is formed with three inwardly-projecting arms 94a, 94b, 94c, and a metal ball 96a, 96b, 96c is press fit into respective arms 94a, 94b, 94c. When the ring 90 is fastened to the support 78, the interferometer 60 is held securely between, on the one hand, the balls 96a, 96b, 96c of the ring 90 and, on the other hand, the balls 82, 84 (and the third support ball, not shown) of the support 78. Also, the interferometer 60 rests upon the wires 86, 88. With this combination of structure, the interferometer 60 is held securely, and is also essentially isolated from minor thermally-induced motion of the mounting platform 28 and the holder 74.

Referring back to FIG. 1, the sinusoidal optical interference fringe pattern from the interferometer 60, represented by the curve 98, impinges upon a linear photoelectric detector array, preferably a CCD array 100, which is sensitive in the desired wavelength range. In reference to FIG. 1, the diffraction element 52, interferometer 60, and CCD array 100 are positioned such that light traverses about one hundred sixty millimeters (160 mm) from the element 52 to CCD array 100. This is sufficiently short to result in a relatively compact wavelength meter 10, while sufficiently long to avoid the necessity of using of a very small (>>5μ) diffraction aperture, and then requiring analysis of the severe non-linearities which would result.

In one presently preferred embodiment, the CCD array 100 is a monolithic self-scanning photodiode array made by Reticon Corporation of Sunnyvale, Calif., Kodak, or Hamamatsu of Japan. Accordingly, the array 100 includes one thousand twenty four (1024) separate receiving pixels 102, with each pixel 102 about one-half millimeter (0.5 mm) high and twelve microns (12μ) wide. The pixels 102 are spaced thirteen microns (13μ) center to center.

Like the interferometer 60, the CCD array 100 is supported such that it is isolated from thermally-induced movement of the mounting platform 28. The specific means by which the CCD array 100 is supported is shown in FIGS. 4 and 5, which show that a metal CCD holder 104 has a parallelepiped-shaped base 106 fastened to the mounting platform 28 and a parallelepiped-shaped support 108 extending upwardly from the base 106 and orthogonal thereto.

In cross-reference to FIGS. 4 and 5, the support 108 is formed with a rectangular window 110, and the CCD array 100 is juxtaposed with window. A first end 112 of the array 100 extends past an edge 114 of the window 110, and is held against the support 108 by a wedge 116. Specifically, the wedge 116 has an angled surface 118 which contacts the array 100 and holds the array 100 against the support 108.

The array 100 has a second end 120, and a flat plastic spring 122 having one degree of flexion has first and second ends 124a, 124b disposed adjacent the second end 120 of the array 100. More particularly, a metal ball 126 is press-fit into the first end 124a of the spring 122, and the ball 126 is epoxy bonded to the second end 120 of the array 100. The second end 124b of the spring 122 is fastened to a spring holder 128, and the spring holder 128 is in turn fastened to or formed integrally with the support 108 of the CCD holder 104 by suitable means. If desired, an auxiliary CCD support 130 can be fastened to the support 108 to further support the CCD array 100.

The spring 122 absorbs motion of the holder 104 relative to the CCD array 100. Also, the window 110 of the support 104 is configured such that a gap 132 is established between an edge 134 of the window 110 and the CCD array 100. It is thus to be appreciated that the array 100 is securely held by the CCD holder 104, while being substantially isolated from stress caused by expansion of the mounting platform 28 or CCD holder 104.

In cross-reference to FIGS. 1 and 5, a flexible flat stripe cable 136 interconnects the CCD array 100 and a timing and control unit 138. The timing and control unit 138 produces all necessary voltages and clock signals for the array 100, and also accepts external trigger pulses from pulsed lasers.

As shown in FIG. 1, the interference pattern curve 98, which is converted by the array 100 into a video signal, is digitized in the control unit 138. This digitized signal is used as an input to a computer 140 which may be either a microprocessor, or PC, for example IBM—compatible personal computer. The computer 140 analyzes the digitized interference pattern in accordance with the method disclosed below to determine the wavelength of the light from the laser 14.

The present invention also contemplates adjusting the analysis of the interference fringe pattern for temperature variations within the housing 22. To this end, a temperature sensor 142 is mounted on the mounting platform 28. The temperature sensor 142 may be of any type having a resolution and stability of about one one-hundredth of a degree (0.01°). In the preferred embodiment a copper resistance thermometer is used, and the sensor 142 is connected to the control unit 138 by a flexible cable 144. In the control unit 138, the analog signal from the temperature sensor 142 is digitized and then sent to the computer 140.

Referring now to FIG. 6, the optical path difference (OPD) formation in the wavelength meter 10 can be appreciated. OPD (and, hence, the intensity of the interference fringe pattern at any pixel 102 of the array 100) depends on the difference between the length made up of the ray lines 58a, 66a, 68a and the length made up of the ray lines 58b, 66b, 68b. Dark fringes will be present at those pixels 102 where OPD is equal to the integer number of light beam 12 wavelengths.

FIG. 6 shows typical OPD dependencies versus pixel 102 number for several wavelengths, namely, 400 nm, 632 nm, and 900 nm. The nonlinearity of the curves is very much exaggerated in FIG. 6 for illustration purposes. Nevertheless, as can be appreciated in reference to FIG. 6, the OPD dependence is a nonlinear function of the two parameters, pixel 102 number (i.e., distance along the CCD array 100), and light beam 12 wavelength.

In overview, the method of determining the wavelength of the light beam 12 is based on the power expansion of the OPD at the pixel 102 number 0 and power expansion of the OPD dependence on the pixel number. The expansion coefficients are determined during the calibration procedures discussed below, wherein several fringe patterns from sources of light having known wavelengths are analyzed.

Additionally, the method for determining wavelength used in the present invention accounts for temperature variations in a novel way not previously considered in the art. OPD depends on the temperature changes of both the refraction index of the interferometer 60, and on thermally-induced or mechanically-induced expansion, contraction, and bending of the all essential parts of the wavelength meter, i.e., the interferometer 60 and its holder 74, the CCD array 100 and its holder 104, the mounting platform 28, and diffraction element holder 56. This dependence must be taken into account, because thermally-induced mechanical shifts of the fringe pattern curve 98 on the CCD array 100 as small as one two-hundredth ($\frac{1}{200}$) of an array pixel 102 (i.e., about five-hundredths of a micron (0.05μ)) can produce unacceptably high wavelength measurement errors.

As discussed above, one novel way by which the present invention reduces errors attributable to thermal changes is to isolate the components of the wavelength meter 10 by placing them in the thermal housing 22, and by mounting the components so as to isolate them from thermally-induced mechanical stress in the mounting platform 28. Additionally, as discussed in further detail below, the analysis undertaken by the computer 140 modifies wavelength determinations to account for thermally-induced variations in OPD and in the refraction index "n" of the interferometer 60.

Figure 7:
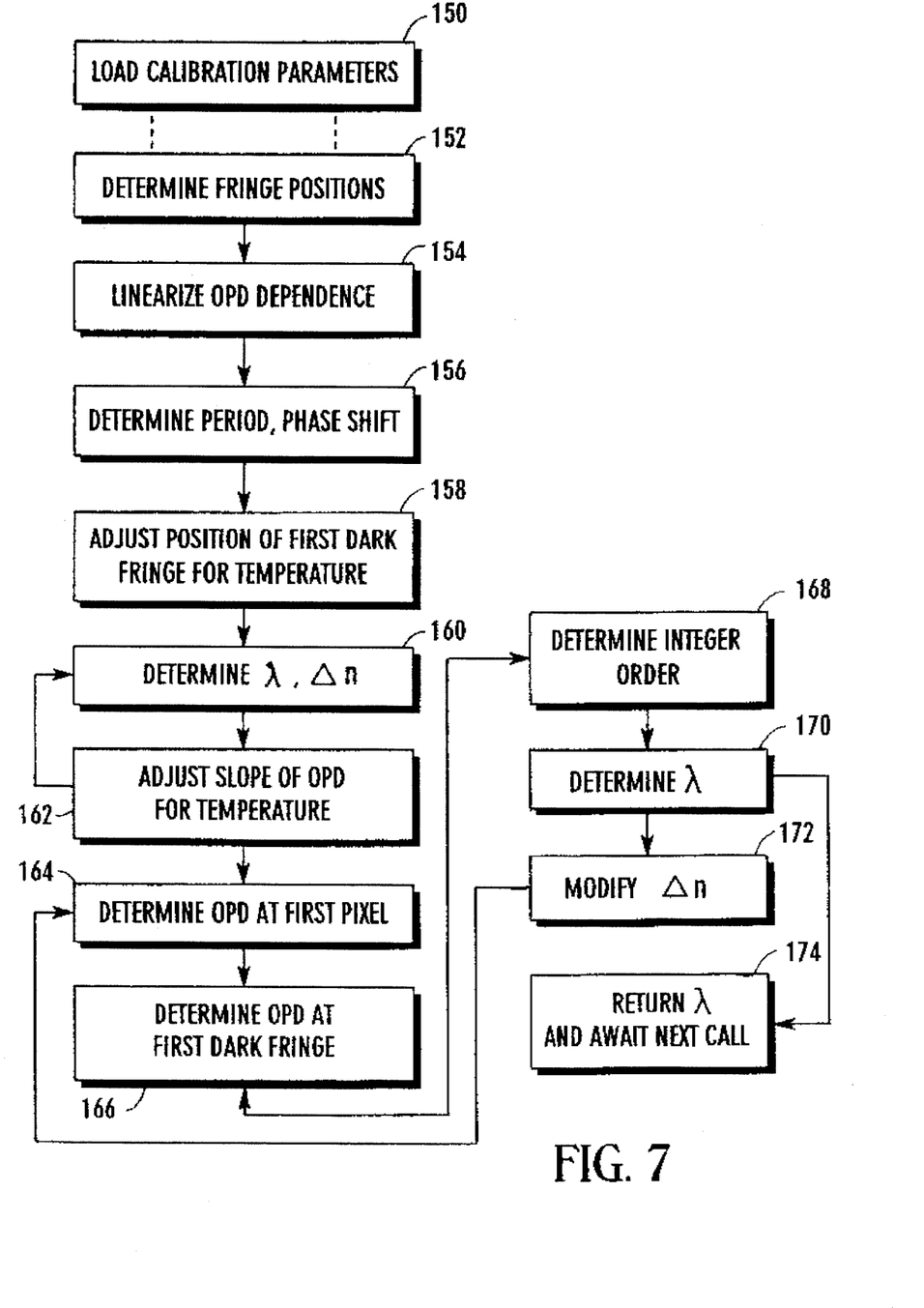
FIG. 7 is a block diagram showing the data processing steps of the present invention.

Now referring to FIG. 7, the details of the analysis of the present invention may be seen. As contemplated by the presently preferred embodiment, the program used by the computer 140 to determine wavelength is written in Borland TURBO PASCAL, and is included herein as Appendix A. Other suitable computer languages, including assembly languages, may be used.

In Appendix A, the algorithm is implemented as a function Get_Lambda, and is incorporated into the Borland Turbo Pascal unit COMPWM. Get_Lambda can be invoked thereafter from any user's program. Also, the unit COMPWM uses unit WmProc, where all necessary functions and procedures are implemented and also unit LArrDrv containing the linear array and temperature sensor drivers.

Starting at block 150, the initial values are loaded for several parameters as determined during the calibration procedure discussed below. These parameters include:

$\lambda_{ref}$=reference wavelength, selected to be in the approximate middle of the expected wavelength band;

$n_{ref}$=reference refraction coefficient for the interferometer 60 at $\lambda_{ref}$;

$L_0$=OPD at pixel 0 at $\lambda_{ref}$;

$L_1$=linear correction coefficient for OPD;

$L_2$=quadratic correction coefficient for OPD;

$S_c$=initial slope of OPD linearized correction at $\lambda_{ref}$;

$S_{c1}$=linear correction coefficient for OPD slope;

$S_{c2}$=quadratic correction coefficient for OPD slope;

$S_{c3}$=cubic correction coefficient for OPD slope;

$T_{kP}$=temperature coefficient for phase shift due to temperature variation;

$T_{kSc}$=temperature coefficient for OPD slope change due to temperature variation.

After the calibration parameters have been loaded, the program waits for invocation. Upon invocation, the computer 140 moves to block 152, wherein the fringe positions (i.e., the minima and maxima of the interference fringe pattern produced by the light beam 12 from the laser 14) as detected by the array 100 are read and determined using a digital filtering algorithm similar to the one described in Snyder. Then, at block 154, the fringe positions, which are related to the curvilinear OPD curve shown in FIG. 6, are linearized using the following third order polynomial expansion:

$$position_i = position_{i(meas)} + S_{c2} * position_{i(meas)}^2 + S_{c3} * position_{i(meas)}^3 \quad (1)$$

where $position_i$=linearized fringe position, and $position_{i(meas)}$=measured fringe position.

If desired, a higher or lower order polynomial expansion can be used, or an expansion using other types of functions. Further, if desired, the process in block 154 can be repeated through a plurality of iterations to take into account wavelength-dependent variations in the expansion coefficients. I have found such variations to be relatively minor, however.

Next, at block 156, the half-period T and the phase shift P of the interference fringe pattern are determined using a standard linear least squares fit of the now-linearized fringe positions. From block 156, the computer 140 proceeds to block 158, wherein the phase shift P of the position of the first fringe is corrected for temperature variations from calibration conditions to a value $P_k$ using the equation:

$$P_k = P - T_{kP} * \Delta t, \quad (2)$$

where $\Delta t$ is the difference between the temperature inside the housing 22 at block 150 as measured by the temperature sensor 142 and a preselected reference temperature inside the housing 22, which can conveniently be set to zero.

If desired, a higher order correction can be used.

Also, at block 158, the computer 140 adds a half period (0.5T) to $P_k$ if the first fringe is a bright fringe. Otherwise, the computer 140 does not further modify $P_k$ at block 158. Thus, $P_k$ as determined in block 158 is the position of the first dark fringe.

From block 158, the computer 140 moves to block 160, wherein the computer 140 makes a first approximation of the wavelength λ of the laser 14 and of the change in interferometer 60 refraction coefficient An using the equations:

$$\lambda = 2 * S_c * T. \quad (3)$$

$\Delta n = K_\lambda - n_{ref}$, where $K_\lambda$ is the expansion of the refraction coefficient of the interferometer 60 at the wavelength λ determined at this block. Expansion coefficients for $K_\lambda$ will ordinarily be available from the manufacturer of the material used to make the interferometer 60.

Next, the computer 140 moves to block 162, wherein the slope of the OPD dependence (which essentially is a proportionality coefficient between the wavelength of the laser 14 and the period of the fringes) is adjusted as follows:

$$S_{corr} = S_c * (1 + S_{c1} * \Delta n + T_{kSc} * \Delta t) \quad (4)$$

From block 162, the computer 140 loops back to block 160, wherein λ is recalculated using $S_{corr}$ in lieu of $S_c$, and then Δn is recalculated using the recalculated value of λ. In the preferred embodiment, two iterations appear to be enough. For second and subsequent recalculations of $S_{corr}$, the temperature dependence term $T_{kSc} * \Delta t$ is omitted. If desired, a wavelength dependence of the temperature correction coefficients may be taken into account while making successive iterations of both first approximate and final values of the source wavelength λ.

After the iteration process described above, the computer 140 moves to block 164, wherein OPD $L_{0c}$ at the first pixel is determined by using the following polynomial expansion:

$$L_{0c} = L_0 + L_1 * \Delta n + L_2 * \Delta n^2 \quad (5)$$

Next, at block 166, OPD $L_{min}$ at the first dark fringe is determined as follows:

$$L_{min} = L_{oc} - X_1 * S_{corr}, \quad (6)$$

where $X_1$ is the position of the first dark fringe as detected by the array 100 and as modified at block 158.

Wave physics teaches that the OPD at the dark fringe must be equal to an integer number of the source wavelengths ($Int_{ord}$) which is accordingly determined at block 168 as the nearest integer value of the ratio $L_{min}/\lambda$.

From block 168, the computer 140 moves to block 170, wherein λ is re-determined as follows:

$$\lambda = L_{min}/Int_{ord} \quad (7)$$

and then Δn is recalculated at block 172 using the newest calculation of λ as follows:

$$\Delta n = K_\lambda - n_{ref}$$

From block 172, the computer 140 loops back to block 164. Several iterations of blocks 164–170 may be performed in accordance with the principles set forth above. I have found that two iterations produce an acceptably precise measurement of λ.

After the iteration process described above, the computer 140 proceeds to block 174, wherein the computer 140 returns the calculated value of λ to the main program for graphical or alphanumeric display of λ, or other purposes, and then awaits main program calls for subsequent λ calculation.

Figure 8:
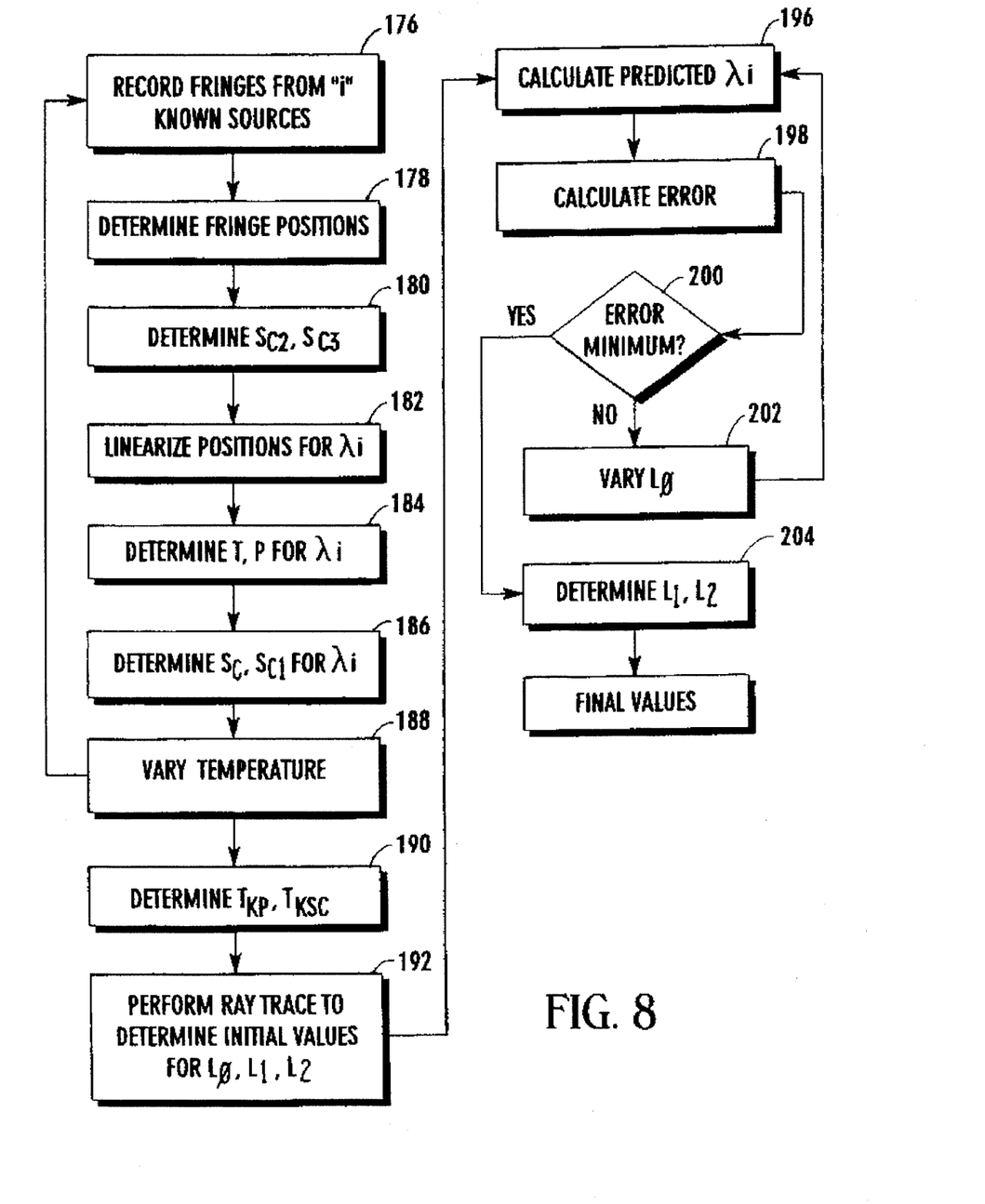
FIG. 8 is a block diagram showing the calibration steps of the present invention.

Now referring to FIG. 8, the calibration procedure of the present invention can best be appreciated. At block 176, light from a laser source of known wavelength $\lambda_i$ is directed into the wavelength meter 10. The procedure disclosed below contemplates repitition with "i" laser sources of known wavelengths. I have found that 5–6 sources are sufficient.

At block 176, the fringes from the "i" known sources are recorded. Then, the fringe positions relative to the pixels 102 as detected by the array 100 are determined at block 178. Next, a least squares fit of the fringe positions for each $\lambda_i$ is performed at block 180, to obtain values for $S_{c2}$ and $S_{c3}$ using equation (1) above.

Then, at block 182, the fringe positions are linearized, and T, P are determined for each $\lambda_i$ using a least-squares fit of the now-linearized fringe positions at block 184. Using equation (3) above, $S_c$ is determined for each $\lambda_i$ at block 186, and a least squares fit of $S_c/\lambda_i$ is performed to determine $S_{c1}$.

As indicated at block 188, the process described above and represented by blocks 176–186 is repeated at several different temperatures as measured by the temperature sensor 142. After obtaining the above values for several different temperatures, $T_{Kp}$ and $T_{Ksc}$ may be determined at block 190 using equations (2) and (4) above, respectively.

The calibration next proceeds to block 192, wherein initial values for $L_0$, $L_1$ and $L_2$ are calculated using a well-known geometric based ray trace. More particularly, initial values for $L_0$, $L_1$, and $L_2$ can be obtained geometrically using known parameters (i.e., the locations of the interferometer 60 and the array 100, the thickness of the interferometer 60, and so on) of the wavelength meter 10.

It is to be understood that the calibration process described below is iterative and is intended to be repeated sequentially to determine final values for $L_0$, $L_1$, and $L_2$. Thus, $L_0$ is initially calculated.

Using the initial values for $L_0$, $L_1$, and $L_2$ obtained at block 192 and equations (5), (6), and (7) above, a predicted value for $\lambda_i$ (wherein $\lambda_i$ can be any one of the known laser wavelengths) is calculated at block 196.

At block 198, the error between the predicted and known values for $\lambda_i$ is determined using the equation:

$$Error = \Sigma_{N+1\ to\ i} (\lambda_i^{known} - \lambda_i^{predicted})^2$$

Next, the process proceeds to decision block 200, wherein it is determined whether the error between the predicted and known values for $\lambda_i$ is at a minimum. If it is not, the process proceeds to block 202, wherein $L_0$ is varied by one part in a million. The process then returns to block 196 and repeats the above-described procedure until it is determined that the error between the predicted and known values for $\lambda_i$ is at a minimum at block 200.

When the error between the predicted and known values for $\lambda_i$ is at a minimum, a relatively accurate determination of $L_0$ has been made. Accordingly, values are next determined for $L_1$ and $L_2$ at block 204, using the process set forth above and using the relatively accurate value of $L_0$ determined above (to determine $L_1$) and the relatively accurate values of $L_0$ and $L_1$ (to determine $L_2$).

When all three parameters $L_0$, $L_1$, and $L_2$ for the particular known wavelength $\lambda_i$ being analyzed have been relatively accurately determined, a final least squares fit of the differences between $\lambda_i^{known}$ and $\lambda_i^{predicted}$ is performed using the relatively accurate values of $L_0$, $L_1$, and $L_2$ to obtain final values for $L_0$, $L_1$, and $L_2$.

Figure 9:
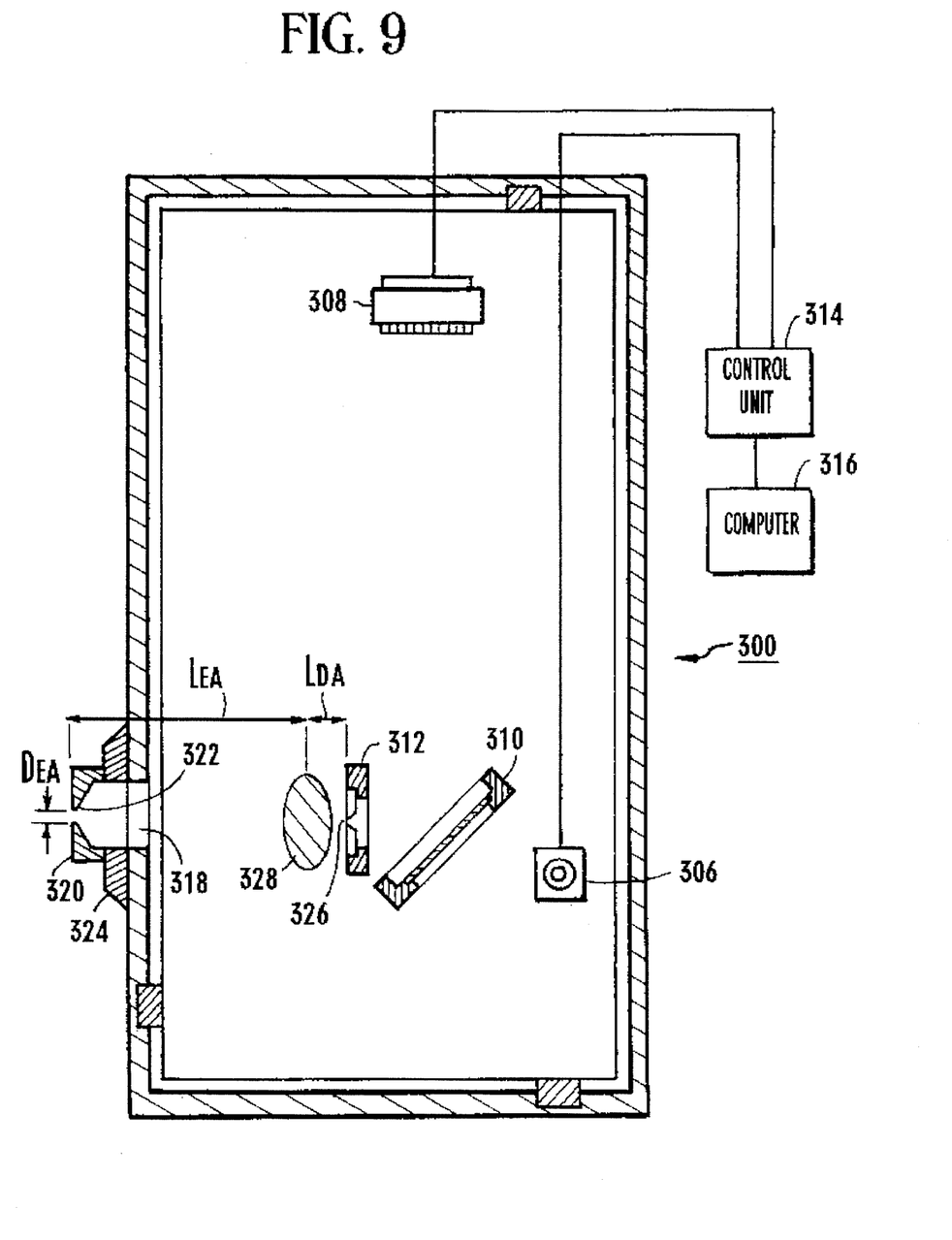
FIG. 9 is a schematic top plan view of an alternate embodiment of the wavelength meter, which includes a beam alignment assembly including a magnifying lens.
Figures 10, 11, 12, 13:
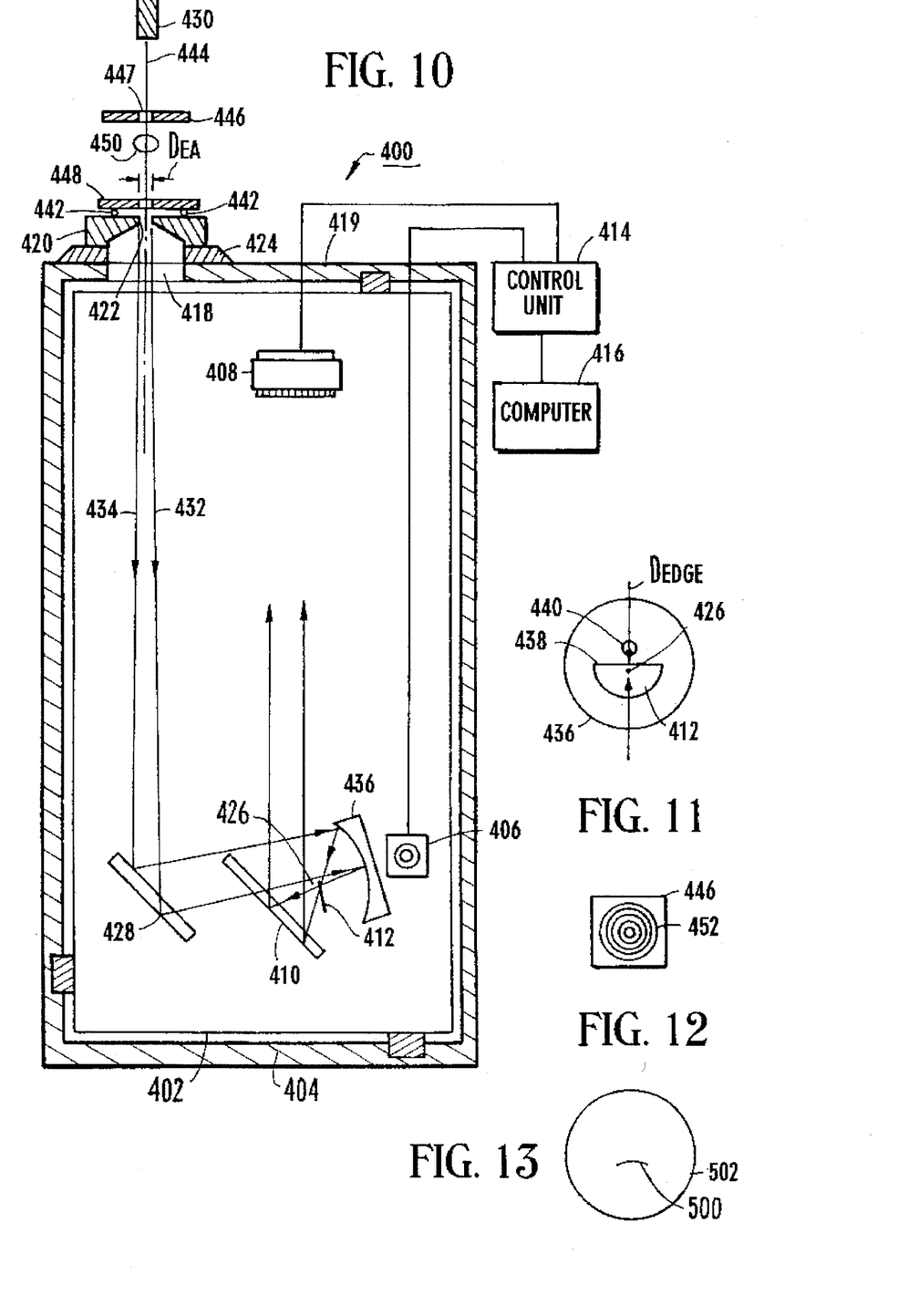
FIG. 10 is a schematic top plan view of yet another alternate embodiment of the wavelength meter, which includes a beam alignment assembly including focussing mirrors.
FIG. 11 is a schematic front elevational view of the focussing mirror and diffraction element shown in FIG. 10.
FIG. 12 is a schematic front elevational view of the target plate shown in FIG. 10.
FIG. 13 is a schematic front elevational view of an alternate embodiment of the diffraction element.

Now referring to FIGS. 9 and 10, two alternate embodiments of the wavelength meter of the present invention are shown which include respective assemblies for aligning laser light with and focussing the light onto the relatively small diffraction apertures of the wavelength meters. As the skilled artisan will appreciate, given the small (about 5µ) dimension of the diffraction aperture used in the present invention, such alignment and focussing must be accomplished with very close tolerances, i.e., with tolerances of about one-tenth of the dimensions of the aperture. In the presently preferred embodiment, this equates to tolerances of about one-half micron (0.5µ) in the x- and y- directions (the dimensions in the major plane of the diffraction element) and about 10µ in the z-dimension (the dimension perpendicular to the major plane of the diffraction element). Furthermore, the path of the laser light must be angularly aligned with the wavelength meter within a tolerance of a few degrees.

Such precise alignment can be difficult to achieve, because the diffraction aperture is too small to be seen with the naked eye. Complicating the matter is the fact that the diffraction elements must be very thin. Consequently, laser light mistakenly directed against the wall of a diffraction element, instead of through the diffraction aperture, can damage the element. Accordingly, it is desirable to avoid prolonged alignment procedures wherein laser light can undesirably be directed against the wall of the diffraction element.

To overcome the above-noted alignment problems, both alternate embodiments include substantially all of the components described in reference to FIGS. 1–8 above, in addition to the below-discussed alignment assemblies. It should be noted that the embodiment shown in FIG. 10, which aligns the incoming laser beam based upon principles of reflection, is currently preferred over the embodiment shown in FIG. 9, which aligns the laser beam using refractive optics and which can consequently introduce chromatic aberrations.

Referring first to the embodiment shown in FIG. 9, a wavelength meter, generally designated 300, includes a mounting platform 302 positioned in a thermally insulative housing 304. A temperature sensor 306 is also mounted on the platform 302, as are a CCD array 308, an interferometer 310, and a diffraction element 312. The platform 302, housing 304, sensor 306, CCD array 308, interferometer 310, and diffraction element 312 are substantially identical in construction and operation as the platform 28, housing 22, sensor 142, CCD array 100, interferometer 60, and diffraction element 52, respectively, shown and described above in reference to FIGS. 1–8. Further, the CCD array 308 and sensor 306 are electrically connected to a control unit 314 which is in turn connected to a computer 316, and the computer 316 operates substantially identically to the computer 140 shown in FIG. 1 and described in reference to FIG. 7 above.

FIG. 9 shows that the housing 304 is formed with an opening 318, and a rigid annular entrance element 320 having an entrance aperture 322 is juxtaposed with the opening 318. As shown, the entrance element 320 is mounted on an entrance base 324. It is to be understood that the entrance element 320 can be moved on the entrance base 324 to adjust the position of the entrance aperture 322 relative to the opening 318. After proper adjustment as described below, the entrance element 320 can then be fixed with respect to the base 324.

In reference to FIG. 9, the diameter $D_{EA}$ of the entrance aperture 322 is about one hundred microns (100µ), which is substantially larger than the five micron (5µ) diameter of the diffraction aperture that is established by the diffraction element 312. Also, a focussing lens 328 is positioned between the apertures 322, 326, and the length $L_{EA}$, from the entrance aperture 322 to the lens 328 is about twenty (20) times the length $L_{DA}$ from the diffraction aperture 326 to the lens 328. The focussing lens 328 focusses substantially all of the light which propagates through the entrance aperture 322 onto the diffraction aperture 326. Together, the focussing lens 328 and entrance element 320 establish an alignment assembly.

Accordingly, with the above-described arrangement, the skilled artisan will appreciate that the entrance aperture 322 is the geometric optic image of the diffraction aperture 326, in that substantially all of the light which propagates through the entrance aperture 322 is directed through the diffraction aperture 326. Owing to the relatively large size of the entrance aperture 322, however, the entrance aperture 322 can be seen with the naked eye. Consequently, it is relatively easy to manipulate a laser apparatus to align a laser beam with the entrance aperture 322 and, hence, with the diffraction aperture 326.

The initial positioning of the entrance element 320 is accomplished by directing light from a test source (not shown), e.g., a helium-neon (He-Ne) laser, first through the diffraction element 326 toward the entrance aperture 322, and then moving the entrance element 320 as appropriate such that the light propagates through the entrance aperture 322.

Now referring to FIG. 10, a wavelength meter, generally designated 400, includes a mounting platform 402 positioned in a thermally insulative housing 404. A temperature sensor 406 is also mounted in the housing 404, as are a CCD array 408, an interferometer 410, and a diffraction element 412. The platform 402, housing 404, sensor 406, CCD array 408, and interferometer 410 are substantially identical in construction and operation as the platform 28, housing 22, sensor 142, CCD array 100, and interferometer 60, respectively, shown and described above in reference to FIGS. 1–8. Further, the CCD array 408 and sensor 406 are electrically connected to a control unit 414 which is in turn connected to a computer 416, and the computer 416 operates substantially identically to the computer 140 shown in FIG. 1 and described in reference to FIG. 7 above.

FIG. 10 shows that the housing 404 is formed with an opening 418 generally opposite the interferometer 410 in the wall 419 of the housing 404 that is near the CCD array 408, and a rigid annular entrance element 420 having an entrance aperture 422 is juxtaposed with the opening 418. As shown, the entrance element 420 is mounted on an entrance base 424. It is to be understood that the entrance element 420 can be moved on the entrance base 424 to adjust the position of the entrance aperture 422 relative to the opening 418. After proper adjustment as described below, the entrance element 420 can then be fixed with respect to the base 424.

In reference to FIG. 10, the diameter $D_{EA}$ of the entrance aperture 422 is about one hundred microns (100μ), which is substantially larger than the five micron (5μ) diameter of the diffraction aperture that is established by the diffraction element 412.

A reflecting mirror 428 is positioned in the housing 404 to receive light from a laser 430 which propagates through the entrance aperture 422. The limiting rays of the light pathway from the laser 430 are schematically represented by the lines 432, 434. The reflecting mirror 428 in turn reflects the light to a spherical focussing mirror 436 having a radius of curvature of about fifteen millimeters (15 mm). Owing to the transparency of the interferometer 410, light from the reflecting mirror 428 can propagate through the interferometer 410 to the focussing mirror 436. As can be appreciated in reference to FIG. 10, the focussing mirror 436 focusses light through the diffraction aperture 426 toward the interferometer 410, and from thence to the CCD array 408. As the skilled artisan will appreciate, by focussing light using principles of reflection vice refraction, chromatic distortions in the alignment of the wavelength meter 400 are reduced. In other words, by focussing light using principles of reflection vice refraction, the wavelength dependency of the precision of the alignment of the wavelength meter 400 is reduced.

As disclosed above, the diffraction aperture 426 is a circle having a diameter of about five microns (5μ), as best shown in FIG. 11. As shown, the diffraction element 412 is shaped as a semi-circle having a straight edge 438, and the distance $D_{edge}$ from the diffraction aperture 426 to the edge 438 is minimized, and is preferably about one millimeter (1 mm). Further, as shown in FIG. 11, the mirrors 428, 436 and diffraction element 412 are positioned such that the area 440 of the focussing mirror 436 against which light from the reflecting mirror 428 impinges is close to the diffraction aperture 426. With this combination of structure, errors attributable to system astigmatism are reduced.

As mentioned above, it is also important to direct laser light from the laser 430 through the entrance aperture 426 substantially along the axis of the entrance aperture 426, with the angle established between the axis and the light pathway minimized, and preferably zero (0).

Accordingly, as shown in FIG. 10, structure is provided for ensuring angular alignment of the laser 430 beam. Specifically, FIG. 10 shows that a plurality of rigid rounded supports 442 are attached to the entrance element 420. Preferably, three supports 442 are attached to the entrance element 420. The supports 442 preferably include threaded cylindrical shafts (not shown) which are threadably engaged with the entrance element 420, such that the positions of the supports 442 can be individually adjusted relative to the entrance element 420.

As shown in FIG. 10, the entrance aperture 422 defines an axis 444 that is substantially perpendicular to the major plane of the entrance element 420. A target plate 446 is positioned outside the housing 404, and this target plate 446 is formed with a circular hole 447 having a diameter equal to or slightly larger than the diameter of the incoming laser beam. Also, a plane parallel reflecting plate 448 having two parallel reflecting surfaces is juxtaposed with the entrance aperture 426 and is positioned against the supports 442. The supports 442 are adjusted such that the reflecting surfaces of the reflecting plate 448 are perpendicular to the axis 444 of the entrance aperture 422. A focus lens 450 should also be positioned between the plates 446, 448.

As shown in FIG. 12, with the above combination of structure, the reflecting plate 448 directs a light pattern 452 consisting of concentric rings onto the target plate 446 for facilitating angular alignment of the light beam with respect to the axis 444 of the entrance aperture 422. This pattern is an interference pattern that is formed by two spherical waves which are reflections of the source laser light from the reflecting plate 448 as focussed by the focus lens 450 onto the target plate 446. Thus, during alignment of the wavelength meter 400 with the laser 430, the user first aligns the laser 430 in the x, y, and z dimensions as described above in relation to the wavelength meter 300 to direct light from the laser 430 through the entrance aperture 422. Then, the user directs light from the laser 430 through the center of the pattern 452 to direct light in a direction that is substantially parallel to the axis 444 of the entrance aperture 422. Stated differently, a predetermined line-of-sight between the laser 430 and the entrance aperture 422 is established by directing the light from the laser 430 through the center of the pattern 452.

In an alternative embodiment (not shown), we come back to the embodiment in FIG. 1, and a diffraction aperture is provided in place of the aperture 54 shown in FIG. 1 which is shaped as an elongated straight slit having a width of about five microns (5μ). Preferably, however, such an elongated diffraction aperture 500 is shaped as an elongated curved slit having a width of about five microns (5μ), a length of about one hundred microns (100μ), and a radius of curvature of about two hundred twenty millimeters (220 mm), as shown in FIG. 13. By so configuring the diffraction aperture 500, wavelength measurement errors due to slight misalignment of the laser 430 are reduced, and the light throughput of the diffraction aperture 500 is increased relative to a 5μ diameter aperture. Consequently, the power level of the incoming laser beam can be reduced, thereby reducing the likelihood of damaging a diffraction element 502 with which the curved aperture 500 is associated.

Because of the considerably larger light through output of the diffraction aperture 500 in comparison with the diffraction aperture 54, no focussing or modest focussing of the light from the laser 12 is needed. As a result, the alignment tolerances are considerably larger (one-tenth of a millimeter in x- and y- directions and fifteen to twenty millimeters in the z- direction).

Angular tolerances remain the same. Angular alignment in the currently preferred embodiment is performed in the same way as described in FIG. 10, using a plane reflecting plate 448 and a target plate 446.

While the particular wavelength meter as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A wavelength meter for determining the wavelength of a light beam, comprising:
   a mounting platform;
   a diffraction element mounted on the mounting platform and formed with a diffraction aperture for generating a spherical light beam, wherein at least part of the light beam can be directed through the diffraction aperture;
   an interferometer mounted on the mounting platform in light communication with the diffraction aperture for receiving the spherical light beam and generating an interference pattern in response thereto;
   a light receiver positioned on the mounting platform to detect the interference pattern; and
   an alignment assembly mounted on the mounting platform for facilitating directing the light beam through the diffraction aperture.

2. The wavelength meter of claim 1, further comprising a thermally insulative housing, wherein the mounting platform is positioned inside the housing.

3. The wavelength meter of claim 2, wherein the housing is formed with an opening, and the alignment assembly includes an entrance aperture juxtaposed with the opening, wherein the entrance aperture is substantially larger than the diffraction aperture.

4. The wavelength meter of claim 3, wherein the entrance aperture is positioned a predetermined distance from the diffraction aperture to establish a light pathway therebetween, and the alignment assembly further includes a focussing member disposed in the light pathway for focussing light from the entrance aperture into the diffraction aperture, such that the entrance aperture is geometrically equivalent to the diffraction aperture.

5. The wavelength meter of claim 4, wherein the focussing member includes at least one lens.

6. The wavelength meter of claim 4, wherein the focussing member includes a focussing mirror having a concave surface facing the diffraction element.

7. The wavelength meter of claim 6, wherein the light beam is generated by a laser and the entrance aperture defines an axis, and the wavelength meter further comprises a target plate positioned outside of the housing and a reflecting plate juxtaposed with the entrance aperture, such that the reflecting plate directs a light pattern onto the target plate for facilitating angular alignment of the light beam with respect to the axis of the entrance aperture.

8. The wavelength meter of claim 7, wherein the diffraction aperture is shaped as a curved slit.

9. A wavelength meter for receiving light generated by a laser, comprising:
   a diffraction element formed with a diffraction aperture for diffracting the light;
   an entrance aperture substantially larger than the diffraction aperture and positioned between the diffraction aperture and the laser, wherein substantially all of the light that propagates through the entrance aperture is directed through the diffraction aperture and
   a target plate positioned between the laser and the entrance aperture for facilitating aligning the light from the laser with the entrance aperture and a reflecting plate positioned between the entrance aperture and the target plate, such that the reflecting plate reflects a portion of the light from the laser passing through the target plate and directs a reflected light pattern onto the target plate for viewing the light pattern and thereby facilitating angular alignment of the light with respect to the axis of the entrance aperture.

10. The wavelength meter of claim 9, further comprising a focussing member disposed in the light pathway for focussing light from the entrance aperture into the diffraction aperture, such that the entrance aperture is geometrically equivalent to the diffraction aperture, wherein the focussing member includes at least one lens.

11. The wavelength meter of claim 10, wherein the focussing member includes a focussing mirror having a concave surface facing the diffraction element.

12. The wavelength meter of claim 9, wherein the diffraction aperture is shaped as a curved slit.

13. A method for aligning a laser beam from a laser and the diffraction aperture of a diffraction element positioned within an enclosed housing having an opening, comprising the steps of:
   (a) juxtaposing an entrance aperture with the opening of the housing, wherein the entrance aperture is substantially larger than the diffraction aperture to facilitate directing the light beam through the entrance aperture;
   (b) positioning a focussing member in the housing to focus substantially all the light from the entrance aperture into the diffraction aperture;
   (c) juxtaposing a reflecting plate having two reflective surfaces with the entrance aperture, such that the reflecting plate reflects a light pattern;
   (d) positioning a target plate outside of the housing to receive the light pattern from the reflecting plate; and
   (e) observing the light pattern on the target plate and establishing a predetermined line-of-sight between the laser and the entrance aperture in response thereto.

* * * * *